United States Patent
Bhatia et al.

(10) Patent No.: US 10,331,751 B2
(45) Date of Patent: Jun. 25, 2019

(54) IDENTIFICATION OF TARGET AUDIENCE FOR CONTENT DELIVERY IN SOCIAL NETWORKS BY QUANTIFYING SEMANTIC RELATIONS AND CROWDSOURCING

(71) Applicant: International Business Machines Corporation, Armonk, NY (US)

(72) Inventors: Nimesh Bhatia, San Jose, CA (US); Seyyed Vahid Hashemian, Redwood City, CA (US); Arnaud J. Le Hors, Santa Clara, CA (US); Cindy H. Lu, San Jose, CA (US); Thai Q. Tran, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/905,188

(22) Filed: Feb. 26, 2018

(65) Prior Publication Data

US 2018/0189410 A1    Jul. 5, 2018

Related U.S. Application Data

(63) Continuation of application No. 14/742,893, filed on Jun. 18, 2015, now Pat. No. 9,946,798.

(51) Int. Cl.
*G06F 16/00* (2019.01)
*G06F 16/9535* (2019.01)

(52) U.S. Cl.
CPC .............................. *G06F 16/9535* (2019.01)

(58) Field of Classification Search
CPC .. G06Q 30/02; G06F 16/2425; G06F 16/9535
See application file for complete search history.

(56) References Cited

U.S. PATENT DOCUMENTS 6,647,425 B1 * 11/2003 Chaddha ................ G06Q 30/02
                                                              709/233
7,865,592 B2   1/2011 Chakra et al.
8,332,345 B1  12/2012 Murphy et al.
8,473,437 B2   6/2013 Zaman et al.
(Continued)

OTHER PUBLICATIONS http://linkeddata.org/, downloaded from the internet on Dec. 18, 2014, 1 page.

(Continued)

*Primary Examiner* — Etienne P Leroux
(74) *Attorney, Agent, or Firm* — Stephen R. Tkacs; Stephen J. Walder, Jr.; Brian M. Restaur

(57) ABSTRACT

A mechanism is provided in a data processing system for content delivery. The mechanism identifies a candidate user of a social networking service. The candidate user has an associated profile including at least one concept of interest. The mechanism determines a probability that the candidate user is interested in an item of content based on a semantic similarity of the at least one concept of interest and at least one concept tag associated with the item of content using a weighted semantic graph. Responsive to the probability exceeding a probability threshold, the mechanism delivers the item of content to the candidate user. Responsive to receiving feedback comprising at least one action taken by the candidate user with respect to the item of content, the mechanism adjusts weights in the weighted semantic graph.

15 Claims, 3 Drawing Sheets

(56) References Cited

U.S. PATENT DOCUMENTS

| | | |
|---|---|---|
| 8,600,812 B2 | 12/2013 | Zhang et al. |
| 8,612,293 B2 | 12/2013 | Benyamin et al. |
| 2007/0033531 A1 | 2/2007 | Marsh |
| 2008/0270538 A1 | 10/2008 | Garg et al. |
| 2012/0221555 A1 | 8/2012 | Byrne et al. |
| 2012/0324367 A1 | 12/2012 | Ilyas et al. |
| 2013/0001724 A1 | 1/2013 | Sweeney et al. |
| 2014/0019385 A1 | 1/2014 | Dawson et al. |
| 2014/0019443 A1 | 1/2014 | Golshan |
| 2014/0156681 A1 | 6/2014 | Lee et al. |
| 2017/0308536 A1* | 10/2017 | Azzam ............... G06F 16/2425 |

OTHER PUBLICATIONS http://schema.org/, downloaded from the internet on Dec. 18, 2014, 1 page.

http://www.circleme.com/users/sign_up, downloaded from the Internet on Dec. 18, 2014, 2 pages.

https://www.facebook.com/, downloaded from the internet on Dec. 18, 2104, 1 page.

https://www.pinterest.com/, downloaded from the Internet on Dec. 18, 2014, 1 page.

List of IBM Patents or Patent Applications Treated as Related (Appendix P), 2 pages.

"What Have You Liked Today—And What Are You Going to Do About It?", Dataversity, http://www.dataversity.net/what-have-you-liked-today-and-what-are-you-going-to-do-about-it/#more-24492, downloaded from the internet on Jun. 17, 2015, 6 pages.

Alur, Nagraj et al., "LinkIntegrity+: A Web Asset Integrity Solution", Proceeding of the 2nd International Conference on Internet Computing (IC 2001), Jun. 2001, pp. 582-590.

Li, Xiao, "Under the Hood: The Natural Language Interface Graph Search", https://www.facebook.com/notes/facebook-engineering/under-the-hood-the-natural-language-interface-of-graph-search/10151432733048920, Apr. 29, 2013, 8 pages.

Thiagarajan, Rajesh et al., "Computing Semantic Similarity Using Ontologies", ISWC 2008, 7th International Semantic Web Conference, Oct. 26-30, 2008, 17 pages.

\* cited by examiner dateuser is interested in an item of content based on a semantic similarity of the at least one concept of interest and at least one concept tag associated with the item of content using a weighted semantic graph. The method further comprises delivering the item of content to the candidate user responsive to the probability exceeding a probability threshold.

IDENTIFICATION OF TARGET AUDIENCE FOR CONTENT DELIVERY IN SOCIAL NETWORKS BY QUANTIFYING SEMANTIC RELATIONS AND CROWDSOURCING

BACKGROUND

The present application relates generally to an improved data processing apparatus and method and more specifically to mechanisms for improving the identification of target audience for content delivery in social networks by quantifying semantic relations and crowdsourcing.

A social networking service is a platform to build social networks or social relations among people who share interests, activities, backgrounds, or real-life connections. A social network service consists of a representation of each user (often a profile), his or her social links, and a variety of additional services. Social networking sites allow individuals to create a public profile, to create a list of users with whom to share connections, and view and cross the connections within the system.

Most social network services are web-based and provide means for users to interact over the Internet, such as e-mail and instant messaging. Social network sites are varied and they incorporate new information and communication tools such as mobile connectivity, photo/video/sharing and blogging. Online community services are sometimes considered a social network service, though in a broader sense, social network service usually means an individual-centered service whereas online community services are group-centered. Social networking sites allow users to share ideas, pictures, posts, activities, events, interests with people in their network.

A semantic network, or frame network, is a network that represents semantic relations between concepts. This is often used as a form of knowledge representation. It is a directed or undirected graph consisting of vertices, which represent concepts, and edges, which represent relations between concepts.

The Resource Description Framework (RDF) is a family of World Wide Web Consortium (W3C) specifications originally designed as a metadata model. RDF has come to be used as a general method for conceptual description or modeling of information that is implemented in web resources, using a variety of syntax notations and data serialization formats. It is also used in knowledge management applications.

The RDF data model is similar to classical conceptual modeling approaches such as entity—relationship or class diagrams, as it is based upon the idea of making statements about resources in the form of subject—predicate—object expressions. These expressions are known as triples in RDF terminology. The subject denotes the resource, and the predicate denotes traits or aspects of the resource and expresses a relationship between the subject and the object. For example, one way to represent the notion "The sky has the color blue" in RDF is as the triple: a subject denoting "the sky," a predicate denoting "has," and an object denoting "the color blue." A collection of RDF statements intrinsically represents a labeled, directed multi-graph, referred to as an RDF graph.

SUMMARY

In one illustrative embodiment, a method, in a data processing system, is provided for content delivery. The method comprises identifying a candidate user of a social networking service. The candidate user has an associated profile including at least one concept of interest. The method further comprises determining a probability that the candidate user is interested in an item of content based on a semantic similarity of the at least one concept of interest and at least one concept tag associated with the item of content using a weighted semantic graph. The method further comprises delivering the item of content to the candidate user responsive to the probability exceeding a probability threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will he described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
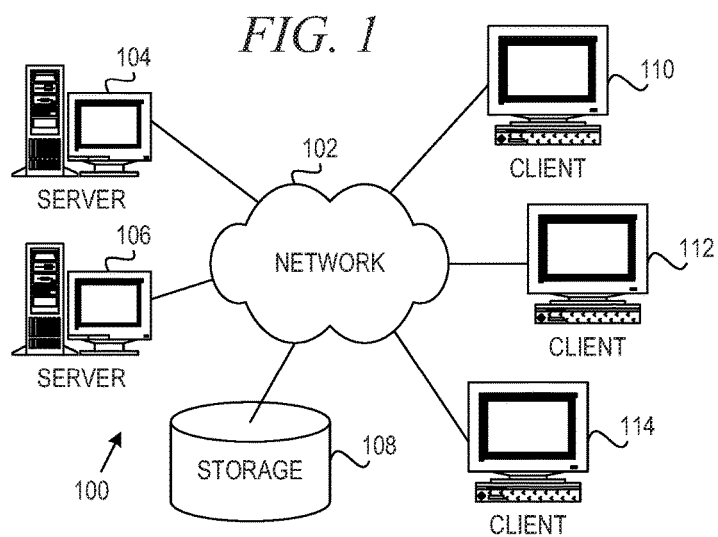
FIG. 1 is an example diagram of a distributed data processing system in which aspects of the illustrative embodiments may be implemented.

Many social networking services provide content (e.g., news, events, advertisements, etc.) to users. In some scenarios, social network services use techniques such as web browser cookies or profiling to deliver content to the right set of users intelligently. Even though a lot of effort goes into implementing effective techniques for targeting users by current social network services, sometimes users find content in their social networking page that appears to have been randomly chosen because it is not aligned with their interests, even though, chances are, it relates to some footprint left from web browsing sessions. In other words, cookie-based user profiling may result in identifying targets for content delivery who are not necessarily interested in the content, because visiting a web site does not necessarily mean the viewer is interested in a concept with which the web site is associated.

The illustrative embodiments provide mechanisms to improve the identification of target audience for content delivery in social networks by quantifying semantic relations and crowdsourcing. Semantic networks provide semantic data and relations in a machine-understandable way. The mechanisms use the relationships between semantic data more intelligently by quantifying the relationships. Without this quantification, it is difficult to determine how similar or how different two semantic concepts at ends of a semantic relation are. The mechanisms of the illustrative embodiments leverage user actions in social network services to quantify semantic relations such that each relation can be associated with a number that specifies the similarity of two concepts. Thus, the mechanisms of the illustrative embodiments use crowdsourcing to dynamically quantify semantic relations to improve content delivery.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
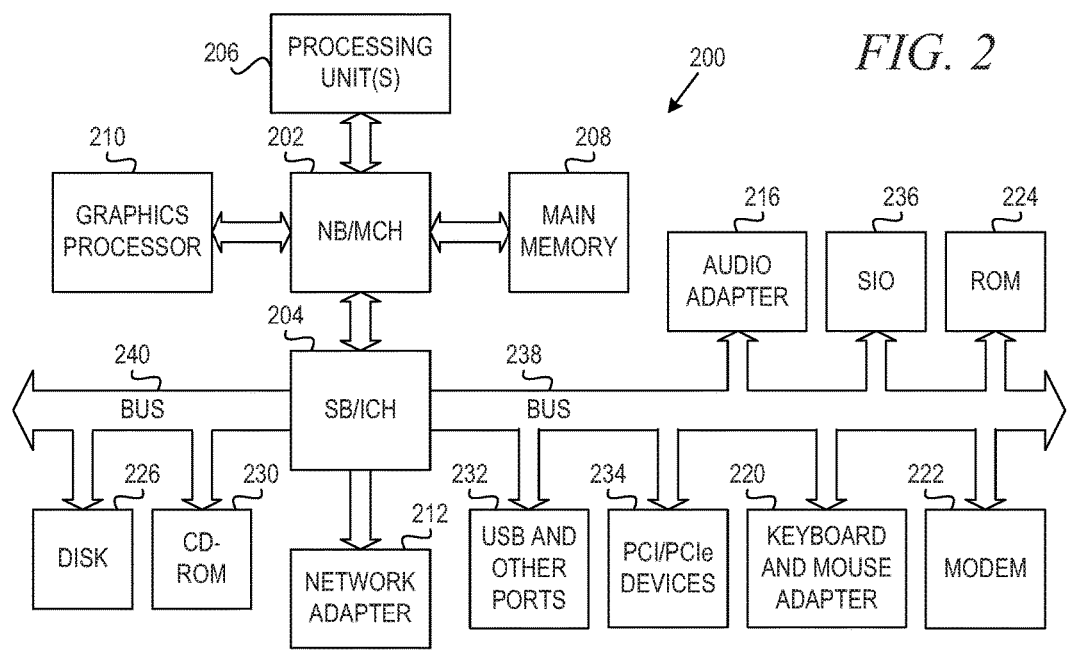
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114, Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet. Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not he considered limiting with regard to the environments in which the illustrative embodiments of the present invention may be implemented.

In accordance with an illustrative embodiment, users at clients 110, 112, 114 are users of a social networking service that is served via a server, such as server 104. The social networking service on server 104 performs social networking functions, such as maintaining user profiles and user relationships, managing groups or communities, allowing content sharing, etc.

A content delivery system executing on server 104 or server 106 introduces content to users. In one embodiment, the content delivery system delivers content through the social networking service; however, in an alternative embodiment, the content delivery system delivers content through other delivery mechanisms that provide some feedback about actions the user takes with respect to the content.

As used herein, content comprises a document, sound file, video file, or other consumable media. For example, content may comprise a news article, a song, a viral video, or an advertisement. The content delivery service may deliver content by reference to storage 108, such as a uniform resource identifier (URI) or, more particularly, a uniform resource locator (URL).

The content delivery system identifies target users for content delivery based at least in part on stated concepts of interest in user profiles, such as, for example, particular musical artists, sports, sport, teams, political groups, charities, books, movies, television shows, school alumni associations, professional organizations, hobbies, fan clubs, etc. In accordance with the illustrative embodiment, the content delivery system improves identification of target users for content delivery based on semantic similarity of concepts in a semantic network. Furthermore, the content delivery system improves the semantic network based on the actions taken by users on the content presented to them.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG, 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volafile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volafile memory for storing operating system files and/or user-generated data, for example. Essentially, data processing system 200 may be any known or later developed data processing system without architectural limitation.

Figure 3:
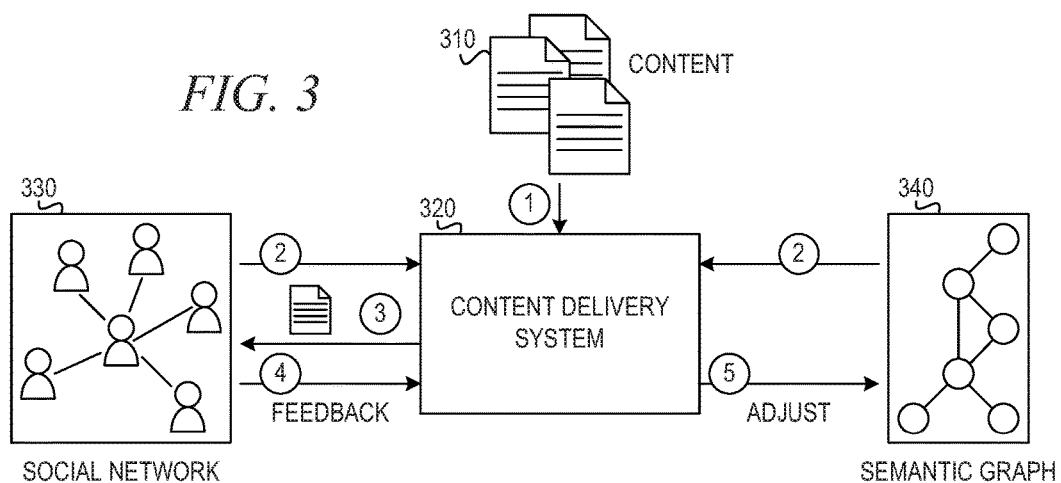
FIG. 3 depicts operation of a content delivery system based on semantic similarity of concepts in a semantic network in accordance with an illustrative embodiment.

FIG. 3 depicts operation of a content delivery system based on semantic similarity of concepts in a semantic network in accordance with an illustrative embodiment. In step 1, content delivery system 320 receives content 310 to be delivered to target users in social network 330. Each item of content has tags of concepts associated with the content. In step 2, content delivery system 320 receives identification of users and concepts of interest from social network 330, as well as semantic graph 340.

Because semantic graphs, also referred to as "semantic networks," are not quantified (i.e., previously, there was no quantifiable way of comparing concepts and relationships), the illustrative embodiments introduce an approach for manually or automatically assigning weights (in the range [0, 1]) to semantic relations in the semantic graph. The weight of a semantic relationship specifies how similar two concepts are, where, for example, 1 means two concepts are identical and 0 means two concepts are not at all related. In accordance with the illustrative embodiment, content delivery system 320 also interprets the weight of a relationship as the probability of someone being interested in a topic (the concept at the end of a semantic relationship) when they are already interested in another topic (concept at the other end of the semantic relationship). These semantic similarity values lead to an improved user experience (i.e., users would receive content that is likely to be aligned with their interests).

In step 3, content delivery system 320 identifies target users in social network 330 for an item of content based on each user's stated concepts of interest and on the probability that the concepts associated the item of content are of interest to the user. Also in step 3, content delivery system 320 delivers the item of content to each identified target user in social network 330.

In step 4, content delivery system 320 receives feedback from the identified target users about actions taken by those users on the content presented to them. If a number of semantic similarity values lead to an item of content being delivered to some users, the social actions of those users to the same content are the proper indication of whether those values need to be adjusted. Content delivery system 320 uses those actions as inputs to a mechanism for adjusting semantic similarity values in semantic graph 340 in step 5

Based on how the illustrative embodiment performs target user identification and semantic network quantification, the functions of target user identification and semantic network quantification occur hand-in-hand. Identification of target users leads to a better quantification of the semantic network, and at the same time better quantification of the semantic network leads to more accurate identification of target users.

In one illustrative embodiment, the social network stores user interest in terms of Uniform Resource identifiers (URIs) A URI uniquely identifies the concept that it represents. Content to be published by the social network has associated tags consisting of URIs. Also, one or more semantic graphs, such as Resource Description Framework (RDF) graphs, exist that connect URIs using semantic relations and represent the semantic network. In such an embodiment, a social network comprises a group of users for which user interest concepts are stored using identifiers (e.g., URIs), items of content have associated concept tags or identifiers (e.g., URIs), and a semantic network comprises one or more semantic graphs (e.g., RDF graphs) in which concepts are represented by the same identifiers (e.g., URIs). Thus, the semantic network allows the content delivery system to relate user interest concepts to the concept tags (identifiers) associated with a given item of content even when the user interest concepts do not exactly match the concept tags of the item of content.

The content delivery system identifies target users based on the user's expressly stated interests (e.g., in a social networking service profile), rather than relying on web browser cookies or web pages previously visited, which may not accurately represent a user's interests. The content delivery system bases quantification of the semantic network on user feedback. Furthermore, the content delivery system dynamically and constantly adjusts the semantic similarity values. At certain times two concepts may be closer to each other than they normally are because of an event, story, etc. Using social actions to adjust similarity helps to bring concepts closer to, or put them farther away from, each other.

For example, a given user of a social networking service may be interested in national politics but not interested in finance; however, for a time lawmakers may be debating changes to financial regulation. During that time, the given user may be more interested in finance. The content delivery system may then adjust the semantic similarity values to increase the probabilities that such a user would find an article on finance of interest.

Figure 4:
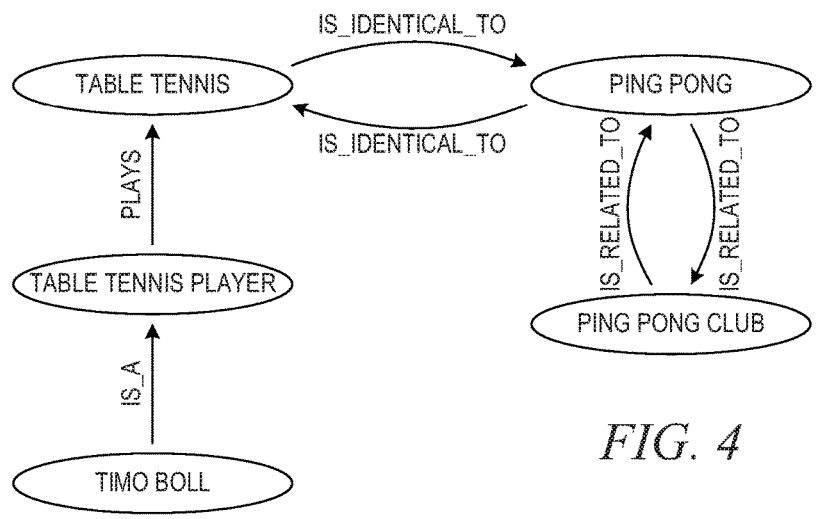
FIG. 4 depicts an example of a semantic graph in accordance with an illustrative embodiment.

FIG. 4 depicts an example of a semantic graph in accordance with an illustrative embodiment. The content delivery system quantifies "semantic similarity" in a semantic network, which refers to how conceptually similar two URIs in the RDF graph are. The content delivery system assigns weights to edges in the semantic graph. The weight of a relationship R from URI node $N_x$ to URI node $$N_y \left( N_x \xrightarrow{R} N_y \right)$$

is a real number in the range [0, 1] that represents how similar the two URIs are. Similarly, this number can be interpreted as the probability of someone being interested in Nx also being interested in Ny (all probability values are independent). The idea is to start with fixed values for each relationship and implement a learning mechanism so that these values can be dynamically adjusted based on the social actions that occur in the system. Note that the same relationship type may eventually have different weights based on what Lab it actually connects. For example, it is reasonable for the "is_a" relationship to have a higher semantic similarity in $$\text{basketball} \xrightarrow{is\_a} \text{ball\_team\_sport} \text{ compared to } \text{basketball} \xrightarrow{is\_a} \text{hobby.}$$

In one example, the graph in FIG. 4 is a semantic graph a content publisher uses to tag content. The content delivery system also uses this graph to identify interests of users. Consider the following weights are initially assigned to various relationships in the graph:

all "is_identical_to" relationships are set to 1.0;
the "is_a_champion_of" relationship is set to 0.95;
the "is_a" relationship is set to 0.9;
all "is_related_to" relationship is set to 0.7.

This means that, for example, the system's initial prediction is that if a user is interested in "Table Tennis," he or she is definitely (probability=1.0) interested in "Ping Pong." If he or she is interested in "Timo Boll," there is a 0.9× 0.95=0.855 chance that he or she is also interested in "Table Tennis" or "Ping Pong." In one embodiment, if there are multiple relations (paths) between two URI nodes, only the relationship with the highest weight value is considered for content delivery.

The content delivery system uses a fixed probability threshold (PT), for example 0.85, to decide whether a given user is a target for delivery of a particular item of content. In other words, if an item of content is tagged with some URIs and there is a 0.85 chance or higher the user is interested in one of those URIs, then the content delivery system feeds the item of content to the user.

To generalize how target users identification can be semantically optimized, consider an item of content is tagged with URIs $T_1, T_2, \ldots, T_m$ and a user's interests include URIs $I_1, I_2, \ldots, I_n$. If the intersection of tags and interests is not empty, it means the user is directly interested in at least one of the tags. Therefore, the content delivery system delivers the item of content.

If the intersection is empty and for some T in $\{T_1, T_2, \ldots, T_m\}$ and some I in $\{I_1, I_2, \ldots, I_n\}$ there is a path from I to T in the semantic network $$\left(I \xrightarrow{R_0} N_1 \xrightarrow{R_1} N_2 \xrightarrow{R_2} \ldots \xrightarrow{R_{k-1}} N_k \xrightarrow{R_k} T\right)$$

where assigned weights of $R_0, R_1, \ldots, R_k$ is $W_0, W_1, \ldots, W_k$, respectively, and the result of all the weights multiplied is above the probability threshold PT ($W_0 \times W_1 \times \ldots \times W_k \geq PT$), it would indicate that there is a close enough similarity between the user's interests and the content. Therefore, the content delivery system delivers the item of content to the user.

If none of the above conditions hold, then the content delivery system determines the item of content is not relevant to the user's concepts of interest. Therefore, the content delivery system does not identify the user as a target for delivery of the item of content.

Further, in accordance with an illustrative embodiment, the content delivery system uses a crowdsourcing approach to quantify the semantic network and to dynamically adjust the relationship weights (i.e., the semantic similarity values) of concepts based on the feedback received from social actions that occur in the social network.

Some relationship weights may not be adjustable. For example, it is reasonable to assume that the weights of relationships "is_identical_to" should always be 1.0 without changing.

In one example embodiment, for adjustable weights, the content delivery system stores additional information, such as how many times the weight has been adjusted. This number, referred to as an "adjustment count," helps to determine how trusted a weight value is. The same way that online ratings based on a large number of user reviews are more trusted by users than ratings based on few user reviews, the content delivery system may trust a semantic relationship weight value that is adjusted 1000 times more than one that has not been adjusted yet. In another embodiment, the content delivery system stores a date of last adjustment, and the content delivery system may trust a semantic relationship weight that has been adjusted more recently than one that has not been recently adjusted.

Consider the semantic graph and the default relationship weights of the previous example. Assume "Alex" is a user of a social networking service and is interested in "Timo Boll." There is an article tagged with "Ping Pong" that is gaining a lot of attention in the social network. The social networking service provider, via a content delivery system that is part of the social networking service or a separate system, is deciding whether to share the article with users who might be interested in the topic. For Alex, the social networking service provider calculates the probability that Alex is interested in the article to be 0.9×0.95×1.0=0.855 (the path from "Timo Boll" to "Ping Pong"), This probability is above 0.85, which is the probability threshold considered by the content delivery system. Therefore, the content delivery system posts the article to Alex's social feed.

There are several scenarios that may occur as a result:

1. Alex does not take any action on the posted article. In this case, the content delivery system can infer that the user is not particularly interested in the article and, therefore, reduces the semantic similarity of URIs "Timo Boll" and "Ping Pong."

2. Alex removes the post from his social feed. In this case, the content delivery system can infer that the user is not at all interested in the article and adjusts the weights by reducing the semantic similarity of the two URIs "Timo Boll" and "Ping Pong" with a higher rate than scenario 1 above.

3. Alex clicks on the post to study its content. This shows that the user is at least fairly interested in the topic, as predicted. In this case, there is no need to perform any similarity adjustments.

4. Alex likes the post and comments on the article. This shows that the user is quite interested in the topic. The content delivery system then adjusts the weights by increasing the semantic similarity of the two URIs "Tim) Boll" and "Ping Pong."

5. Alex shares the content with his contacts in the social network. In this case, the content delivery system can inter that the user is highly interested in the article. The content delivery system adjusts the weights by increasing the semantic similarity of the two URIs "Timo Boll" and "Ping Pong" with a higher rate than scenario 4 above.

Consider a semantic graph path $$I \xrightarrow{R_0} N_1 \xrightarrow{R_1} N_2 \xrightarrow{R_2} \ldots \xrightarrow{R_{k-1}} N_k \xrightarrow{R_k} T,$$

where $R_0, R_1, \ldots, R_k$ are RDF relationships having weights or semantic similarity values $W_0, W_1, \ldots, W_k$ and adjustment counts $C_0, C_1, \ldots, C_k$. Assume that all relationships $R_0, R_1, \ldots, R_k$ have adjustable weights; if not, for the sake of calculation, the content delivery system simply merges the two nodes of any fixed weight relationship to remove that relationship from the path.

Following is one simple example of how the content delivery system adjusts the semantic similarity of two URIs I and T:

1. The content delivery system determines new weights $Y_0, Y_1, \ldots, Y_k$ that lead to a 10% increase in similarity of the two URIs I and T(10% is an example of an adjustment rate AR, which may be set by the content delivery system) such that all weights increased by a fixed ratio. In other words, $$\frac{Y_0}{W_0} = \frac{Y_1}{W_1} = \ldots = \frac{Y_k}{W_k}.$$

If $$\frac{Y_0}{W_0} = \frac{Y_1}{W_1} = \ldots = \frac{Y_k}{W_k} = A,$$

then $A^{k+1}=1+AR=1.1$. Therefore, the increment of each weight is calculated as $A=^{k+1}\sqrt{1.1}$. All weight values are probabilities and cannot be outside the range of [0, 1]. Therefore, $Y_i=\min(A \times W_i, 1)$ 2. In order to find the new semantic similarity values, the content delivery system averages the new weight found above and the current weight of each relationship considering its adjustment count. The new weight of $R_i$ is calculated as $$W'_i = \frac{C_i \times W_i + Y_i}{C_i + 1}.$$

3. The adjustment count of each relationship on the path ($C_i$) is increased by 1.

The formula for lowering the semantic similarity of two URIs is the same as above. Note that for increasing the similarity A>1, and for lowering the similarity A<1.

In one embodiment, if the content and the user each have multiple tags and interests, respectively, the content delivery system selects the path that leads to the highest semantic similarity value to reevaluate the semantic similarity values. The content delivery system may also use other heuristics.

With the knowledge obtained from a large set of users and the method described above, the content delivery system can improve the accuracy of the quantified semantic network. The entity that manages these semantic similarity values (e.g., the social network provider or content delivery system) can sell the collected data as a valuable asset to third parties. Third parties may use the semantic similarity information along with social information (user interests) to provide optimized travel, food, news, entertainment, etc. services to social users. For example, a news website may leverage these semantic similarities to offer relevant news to its users. This is how social networking services can improve semantic network quantification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versafile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
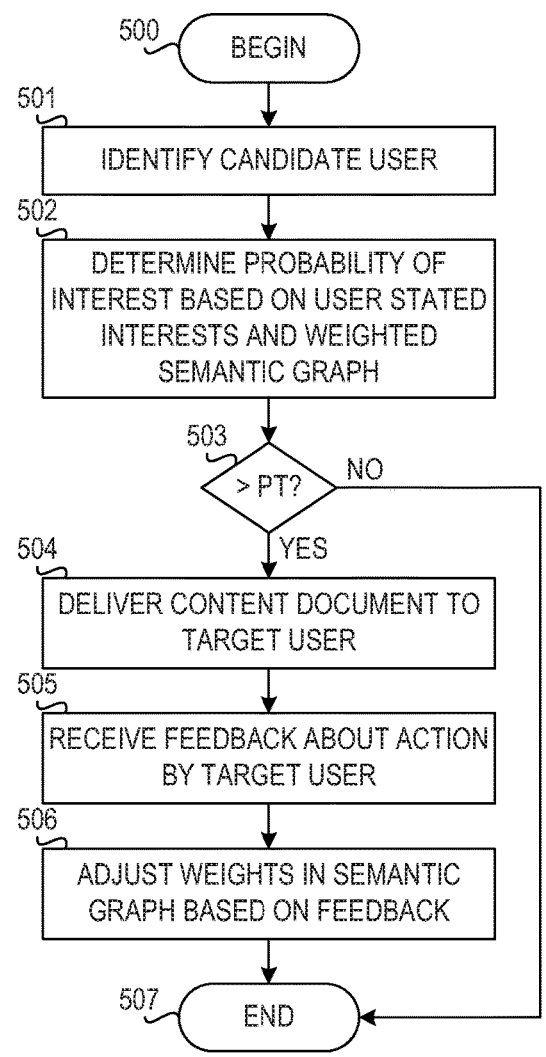
FIG. 5 is a flowchart illustrating operation of a system for identification of target users for content delivery in accordance with an illustrative embodiment.

FIG. 5 is a flowchart illustrating operation of a system for identification of target users for content delivery in accordance with an illustrative embodiment. Operation begins (block 500), and the system identifies a candidate user (block 501). The system may identify the candidate user as a user of a social networking service, for example. In one example embodiment, the system may be a component of the social networking service itself, identifying users that are candidates to receive a given item of content in their social feeds, in another embodiment, the candidate user may have a social networking connection with another user who found the item of content of interest.

The item of content may be an article, image, video, sound file, or any combination of the above. In one embodiment, the item of content is tagged with associated topics or concepts. The tags may take the form of Uniform Resource Identifiers (URIs).

The system then determines a probability that the candidate user will be interested in the item of content based on user-stated interests and a weighted semantic graph (block 502). In one embodiment, the user of a social networking service completes a profile in which the user may identify concepts of interest, such as particular sports, sport teams, musical artists, movies, television shows, etc. The concepts of interest may also be related to professional organizations, school alumni associations, fan clubs, etc. to which the user belongs. The social networking service may also infer concepts of interest based on actions taken by the user in the social networking service. The user-stated interests may comprise URIs.

The weighted semantic graph may be, for example, a Resource Description Framework (RDF) graph with weighted edges that signify relations between nodes, which represent concepts. The concepts in the semantic graph also may be represented by URIs. A weight of an edge connecting two concepts represents a probability that a person interested in one of the concepts would also be interested in the other of the concepts. Thus, each weight may be in the range [0, 1], where two identical concepts have a weight of 1 while two completely unrelated concepts would have a weight of 0, although a weight of 0 would be uncommon.

If a concept of a user-stated interest for the candidate user exactly matches a tag of the item of content, then the system determines the probability to be 1 (100%); otherwise, the system determines the probability based on the weighted semantic graph. If there is no relationship between a user-stated interest and the tags of the item of content (i.e., there is no path between any user-stated interest concept and a concept of the item of content in the semantic graph), then the system determines the probability to be 0. Otherwise, the system determines the probability based on the weights of the weighted semantic graph as described above.

Thereafter, the system determines whether the probability is greater than a probability threshold (PT) (block 503). If the probability is greater than PT, then the system determines that the candidate user is a target for content delivery, and the system delivers the item of content to the target user (block 504). The system then receives feedback about actions taken by the target user with respect to the item of content (block 505). The system adjusts the weights in the semantic graph based on the feedback (bock 506), and operation ends (block 507).

The actions taken by the user provide indications of interest or non-interest to the system. For instance, if the target user does not take any action, then the system may determine that the user is not particularly interested in the item of interest, and the system may decrease the weights making up the relationship between the user-stated interest and the concept of the item of content that lead to the identification of the user as a target for delivery. Also, if the target user performs a "thumbs down" or "dislike" action or deletes the item of content from his or her social feed, then the system may determine that the user is not interested in the item of content and may decrease weights in the semantic graph. On the other hand, if the target user reads the article, performs a "thumbs up" or "like" action, or shares the article, then the system may determine that the user is interested in the item of interest and may increase weights in the semantic graph. The system may increase or decrease weights by an amount that is based on the action taken. Of course, if the action taken by the target user is an expected action based on the determined probability, then the system may decide not to adjust weights in the semantic graph.

If the probability is not greater than the probability threshold in block 503, then operation ends (block 507). The system cannot receive feedback for content that is not delivered to a user.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers, Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for content delivery, the method comprising:
    identifying a candidate user of a social networking service, wherein the candidate user has an associated profile including a user-stated concept of interest;
    determining a probability that the candidate user is interested in an item of content based on a semantic similarity of the user-stated concept of interest and a concept tag associated with the item of content using a weighted semantic graph, wherein the weighted semantic graph comprises nodes representing concepts and edges representing relationships between concepts of connected nodes and wherein each edge is weighted with a semantic similarity value;
    responsive to the probability exceeding a probability threshold, delivering the item of content to a client data processing system of the candidate user; and
    responsive to receiving feedback comprising an action taken by the candidate user with respect to the item of content, adjusting at least one semantic similarity value of a relationship between the user-stated concept of interest and the concept tag in the weighted semantic graph, wherein adjusting the at least one semantic similarity value of a relationship between the user-stated concept of interest and the concept tag in the weighted semantic graph comprises:
        determining an adjustment rate, AR, for the at least one semantic similarity value based on the action; and
        determining an adjustment increment for a given edge in the relationship between the user-stated concept of interest and the concept tag as:

$$A = {}^{k+1}\sqrt{1+AR},$$

where k is a number of edges in the relationship between the user-stated concept of interest and the concept tag; and
    determining a new weight for the given edge as follows:

$$Y_i = \min(A \times W_i, 1),$$

where $Y_i$ is the new weight for the given edge and $W_i$ is the previous weight for the given edge.

2. The method of claim 1, further comprising:
    responsive to adjusting a semantic value of a given edge between two concepts in the weighted semantic graph, incrementing an adjustment count associated with the given edge.

3. The method of claim 1, wherein adjusting the at least one semantic similarity value of a relationship between the user-stated concept of interest and the concept tag in the weighted semantic graph further comprises:
    determining a new semantic similarity value for the given edge as:

$$W_i' = \frac{C_i \times W_i + Y_i}{C_i + 1},$$

where $W_i'$ is the new semantic similarity value and $C_i$ is an adjustment count associated with the given edge representing a number of times the semantic similarity value of the given edge has been adjusted.

4. The method of claim 1, wherein the weighted semantic graph comprises a Resource Description Framework (RDF) graph.

5. The method of claim 1, Wherein the at least one concept of interest, the at least one concept tag associated with the item of content, and concepts in the weighted semantic graph comprise Uniform Resource Identifiers (URIs).

6. A computer program product comprising a computer readable storage medium having a computer readable program stored therein, wherein the computer readable program, when executed on a computing device, causes the computing device to:
    identify a candidate user of a social networking service, wherein the candidate user has an associated profile including a user-stated concept of interest;
    determine a probability that the candidate user is interested in an item of content based on a semantic similarity of the user-stated concept of interest and a concept tag associated with the item of content using a weighted semantic graph, wherein the weighted semantic graph comprises nodes representing concepts and edges representing relationships between concepts of connected nodes and wherein each edge is weighted with a semantic similarity value;
    responsive to the probability exceeding a probability threshold, deliver the item of content to a client data processing system of the candidate user; and
    responsive to receiving feedback comprising an action taken by the candidate user with respect to the item of content, adjust at least one semantic similarity value of a relationship between the user-stated concept of interest and the concept tag in the weighted semantic graph wherein adjusting the at least one semantic similarity value of a relationship between the user-stated concept of interest and the concept tag in the weighted semantic graph comprises:
        determining an adjustment rate, AR, for the at least one semantic similarity value based on the action; and
        determining an adjustment increment for a given edge in the relationship between the user-stated concept of interest and the concept tag as:

$$A = {}^{k+1}\sqrt{1+AR},$$

where k is a number of edges in the relationship between the user-stated concept of interest and the concept tag; and determining a new weight for the given edge as follows:

$$Y_i = \min(A \times W_i, 1),$$

where $Y_i$ is the new weight for the given edge and $W_i$ is the previous weight for the given edge.

7. The computer program product of claim 6, wherein the computer readable program further causes the computing device to:

responsive to adjusting a semantic value of a given edge between two concepts in the weighted semantic graph, increment an adjustment count associated with the given edge.

8. The computer program product of claim 6, wherein adjusting the at least one semantic similarity value of a relationship between the user-stated concept of interest and the concept tag in the weighted semantic graph further comprises:

determining a new semantic similarity value for the given edge as:

$$W_i' = \frac{C_i \times W_i + Y_i}{C_i + 1}.$$

where $W_i'$ is the new semantic similarity value and $C_i$ is an adjustment count associated with the given edge representing a number of times the semantic similarity value of the given edge has been adjusted.

9. The computer program product of claim 6, wherein the weighted semantic graph comprises a Resource Description Framework (RDF) graph.

10. The computer program product of claim 6, wherein the at least one concept of interest, the at least one concept tag associated with the item of content, and concepts in the weighted semantic graph comprise Uniform Resource Identifiers (URIs).

11. An apparatus comprising:
a processor; and
a memory coupled to the processor, wherein the memory comprises instructions which, when executed by the processor, cause the processor to:
identify a candidate user of a social networking service, wherein the candidate user has an associated profile including a user-stated concept of interest;
determine a probability that the candidate user is interested in an item of content based on a semantic similarity of the user-stated concept of interest and a concept tag associated with the item of content using a weighted semantic graph, wherein the weighted semantic graph comprises nodes representing concepts and edges representing relationships between concepts of connected nodes and wherein each edge is weighted with a semantic similarity value;
responsive to the probability exceeding a probability threshold, deliver the item of content to a client data processing system of the candidate user; and
responsive to receiving feedback comprising an action taken by the candidate user with respect to the item of content, adjust at least one semantic similarity value of a relationship between the user-stated concept of interest and the concept tag in the weighted semantic graph, wherein adjusting the at least one semantic similarity value of a relationship between the user-stated concept of interest and the concept tag in the weighted semantic graph comprises:
determining an adjustment rate, AR, for the at least one semantic similarity value based on the action; and
determining an adjustment increment for a given edge in the relationship between the user-stated concept of interest and the concept tag as:

$$A = {}^{k+1}\sqrt{1+AR},$$

where k is a number of edges in the relationship between the user-stated concept of interest and the concept tag; and determining a new weight for the given edge as follows:

$$Y_i = \min(A \times W_i, 1),$$

where $Y_i$ is the new weight for the given edge and $W_i$ is the previous weight for the given edge.

12. The apparatus of claim 11, wherein the instructions further cause the processor to:
responsive to adjusting a semantic value of a given edge between two concepts in the weighted semantic graph, increment an adjustment count associated with the given edge.

13. The apparatus of claim 11, wherein adjusting the at least one semantic similarity value of a relationship between the user-stated concept of interest and the concept tag in the weighted semantic graph further comprises:

determining a new semantic similarity value for the given edge as:

$$W_i' = \frac{C_i \times W_i + Y_i}{C_i + 1},$$

where $W_i'$ is the new semantic similarity value and $C_i$ is an adjustment count associated with the given edge representing a number of times the semantic similarity value of the given edge has been adjusted.

14. The apparatus of claim 11, wherein the weighted semantic graph comprises a Resource Description Framework (RDF) graph.

15. The apparatus of claim 11, wherein the at least one concept of interest, the at least one concept tag associated with the item of content, and concepts in the weighted semantic graph comprise Uniform Resource Identifiers (URIs).

* * * * *